United States Patent
Cannan et al.

(10) Patent No.: US 11,994,015 B2
(45) Date of Patent: *May 28, 2024

(54) COMPOSITIONS AND METHODS FOR USE OF PROPPANT SURFACE CHEMISTRY TO IMPROVE PROPPANT CONSOLIDATION AND FLOWBACK CONTROL

(71) Applicant: CARBO CERAMICS INC., Houston, TX (US)

(72) Inventors: Chad Cannan, Lancaster, NY (US); Thu Lieng, Richmond, TX (US); Daryl Johnson, Houston, TX (US); Mark Conner, Coraopolis, PA (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,517

(22) Filed: Sep. 21, 2021

(65) Prior Publication Data

US 2022/0003098 A1    Jan. 6, 2022

Related U.S. Application Data

(63) Continuation of application No. 16/133,044, filed on Sep. 17, 2018, now Pat. No. 11,125,067, which is a
(Continued)

(51) Int. Cl.
*E21B 43/267* (2006.01)
*C09K 8/80* (2006.01)
(Continued)

(52) U.S. Cl.
CPC ............ *E21B 43/267* (2013.01); *C09K 8/805* (2013.01); *E21B 43/04* (2013.01); *E21B 43/082* (2013.01)

(58) Field of Classification Search
None
See application file for complete search history.

(56) References Cited

U.S. PATENT DOCUMENTS

| 2,378,817 A | 6/1945 | Wrightsman et al. |
| 3,498,380 A | 3/1970 | Sparlin et al. |

(Continued)

FOREIGN PATENT DOCUMENTS

| EP | 0542397 A2 | 5/1993 |
| EP | 1447523 A1 | 8/2004 |

(Continued)

OTHER PUBLICATIONS

International Search Report and Written Opinion of the ISA/US for PCT/US2014/035149 dated Nov. 14, 2014, (19 pages).

(Continued)

*Primary Examiner* — Anuradha Ahuja
(74) *Attorney, Agent, or Firm* — Patterson + Sheridan, LLP

(57) ABSTRACT

Methods for hydraulically fracturing a subterranean formation to improve the production rates and ultimate recovery by contacting unconsolidated resin-coated proppant particulates residing in a propped fracture with a reactive cross-linker in order to form a consolidated proppant pack are described. Additionally, methods for use in water injection wells to consolidate the resin-coated proppant particulates in a gravel packed or frac packed region of a wellbore are also described.

14 Claims, 3 Drawing Sheets

Related U.S. Application Data continuation of application No. 14/259,851, filed on Apr. 23, 2014, now Pat. No. 10,077,645.

(60) Provisional application No. 61/816,348, filed on Apr. 26, 2013.

(51) Int. Cl.
*E21B 43/04* (2006.01)
*E21B 43/08* (2006.01)

(56) References Cited

U.S. PATENT DOCUMENTS

| | | | |
|---|---|---|---|
| 3,857,444 A | 12/1974 | Copeland | |
| 3,935,339 A | 1/1976 | Cooke, Jr. | |
| 4,428,426 A * | 1/1984 | Davies | C09K 8/5755 166/276 |
| 4,487,259 A | 12/1984 | McMichael, Jr. | |
| 4,518,039 A | 5/1985 | Graham et al. | |
| 4,527,627 A | 7/1985 | Graham et al. | |
| 4,785,884 A | 11/1988 | Armbruster | |
| 4,873,145 A | 10/1989 | Okada et al. | |
| 4,888,240 A | 12/1989 | Graham et al. | |
| 4,923,714 A | 5/1990 | Gibb et al. | |
| 5,218,038 A | 6/1993 | Johnson et al. | |
| 5,293,935 A | 3/1994 | Arterbury et al. | |
| 5,311,946 A | 5/1994 | Harry et al. | |
| 5,316,792 A | 5/1994 | Harry et al. | |
| 5,422,183 A | 6/1995 | Sinclair et al. | |
| 5,508,325 A | 4/1996 | Craun et al. | |
| 5,551,513 A | 9/1996 | Surles et al. | |
| 5,837,656 A | 11/1998 | Sinclair et al. | |
| 5,948,734 A | 9/1999 | Sinclair et al. | |
| 5,955,144 A | 9/1999 | Sinclair et al. | |
| 6,209,643 B1 | 4/2001 | Nguyen et al. | |
| 6,311,773 B1 | 11/2001 | Todd et al. | |
| 6,528,157 B1 | 3/2003 | Hussain et al. | |
| 6,586,089 B2 | 7/2003 | Golden | |
| 6,613,720 B1 | 9/2003 | Feraud et al. | |
| 6,632,527 B1 * | 10/2003 | McDaniel | C09K 8/62 428/404 |
| 8,097,119 B2 | 1/2012 | Eagle et al. | |
| 8,183,186 B2 | 5/2012 | Luo et al. | |
| 8,499,827 B2 | 8/2013 | Dusterhoft et al. | |
| 10,077,645 B2 | 9/2018 | Cannan et al. | |
| 2002/0048676 A1 | 4/2002 | McDaniel et al. | |
| 2003/0131998 A1 | 7/2003 | Nguyen et al. | |
| 2005/0006093 A1 | 1/2005 | Nguyen | |
| 2005/0019574 A1 | 1/2005 | McCrary | |
| 2005/0051331 A1 * | 3/2005 | Nguyen | E21B 43/025 166/292 |
| 2007/0089881 A1 | 4/2007 | Hutchins et al. | |
| 2007/0173553 A1 | 7/2007 | Taylor, Jr. | |
| 2008/0230223 A1 | 9/2008 | McCrary et al. | |
| 2008/0283243 A1 | 11/2008 | Rediger et al. | |
| 2009/0205824 A1 | 8/2009 | Sullivan et al. | |
| 2010/0048430 A1 | 2/2010 | Funkhouser et al. | |
| 2010/0065271 A1 * | 3/2010 | McCrary | B32B 5/16 507/224 |
| 2011/0024129 A1 | 2/2011 | Turakhia et al. | |
| 2011/0030949 A1 | 2/2011 | Weaver et al. | |
| 2011/0284225 A1 | 11/2011 | Lord et al. | |
| 2011/0284245 A1 | 11/2011 | Crandall et al. | |
| 2013/0261032 A1 | 10/2013 | Ladva et al. | |
| 2013/0295319 A1 | 11/2013 | Yeager et al. | |
| 2014/0178325 A1 | 6/2014 | Martinez-Castro et al. | |
| 2014/0357535 A1 | 12/2014 | Tang et al. | |

FOREIGN PATENT DOCUMENTS

| | | | |
|---|---|---|---|
| GB | 2099041 A | | 12/1982 |
| WO | 2007104911 A1 | | 9/2007 |

OTHER PUBLICATIONS

European Search Report in related application EP 14787944, dated Nov. 30, 2016.
European Examination Report dated Jun. 9, 2020 for U.S. Appl. No. 14/787,944.
Canadian Office Action dated Apr. 2, 2021 for Application No. 2,909,939.
Canadian Office Action dated Sep. 24, 2021 for Application No. 2,909,939.
Communication pursuant to Article 94(3) EPC dated Nov. 21, 2018 for Application No. 14787944.9.
Canadian Office Action dated Nov. 15, 2023 for Application No. 3,172,559.

* cited by examiner

COMPOSITIONS AND METHODS FOR USE OF PROPPANT SURFACE CHEMISTRY TO IMPROVE PROPPANT CONSOLIDATION AND FLOWBACK CONTROL

CROSS-REFERENCE TO RELATED APPLICATION

This application is a continuation of U.S. patent application Ser. No. 16/133,044, filed Sep. 17, 2018, which is a continuation of U.S. patent application Ser. No. 14/259,851, filed Apr. 23, 2014, which claims the benefit of the filing date of, and priority to, U.S. provisional patent application No. 61/816,348, filed Apr. 26, 2013. The aforementioned disclosures are hereby incorporated herein by reference.

FIELD OF THE INVENTION

The present invention relates to methods for hydraulically fracturing a subterranean formation to improve the hydrocarbon production rates and ultimate recovery by contacting unconsolidated resin-coated proppant particulates residing in a propped fracture with a reactive crosslinker in order to form a consolidated proppant pack. The present invention also relates to methods for use in water injection wells to consolidate the resin-coated proppant particulates in a gravel packed or frac packed region of a wellbore.

BACKGROUND

In order to stimulate and more effectively produce hydrocarbons from oil and gas bearing formations, and especially formations with low porosity and/or low permeability, induced fracturing (called "frac operations", "hydraulic fracturing", or simply "fracing") of the hydrocarbon-bearing formations has been a commonly used technique. In a typical hydraulic fracturing operation, fluid slurries are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fracturing fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fractures reach a formation that is not easily fractured above and/or below the desired frac interval. The directions of maximum and minimum horizontal stress within the formation determine the azimuthal orientation of the induced fractures.

The high pressure fracturing fluids contain particulate materials called proppants. The proppants are generally composed of sand, resin-coated sand or ceramic particulates, and the fluid used to pump these proppant particulates downhole is usually designed to be sufficiently viscous such that the proppant particulates remain entrained in the fluid as it moves downhole and out into the induced fractures. After the proppant has been placed in the fracture and the fluid pressure relaxed, the fracture is prevented from completely closing by the presence of the proppants which thus provide a high conductivity flow path to the wellbore which results in improved production performance from the stimulated well.

Sometimes, a wellbore will need to be "gravel packed" before production from the well begins in order to prevent particles (typically referred to as formation fines) from entering the wellbore. Gravel packing is necessary in formations that contain individual sand grains that are not tightly cemented together. If the individual sand grains remain unconsolidated, when production of the formation begins, the force of fluid flow will tend to move the unconsolidated sand grains into the wellbore. Gravel packing prevents this problem. In gravel packing, proppant is placed in the annulus of a wellbore, next to the unconsolidated formation fines, essentially working as a filter between the wellbore and the formation. The proppant is held in place by a slotted screen which prevents the proppant (and formation fines) from migrating into the wellbore, while still allowing the formation fluids to do so. If the wellbore is cased, the casing is first perforated in order to establish communication between the wellbore and the formation. The gravel packing process is generally performed in all formations that are considered to have unconsolidated formation fines, like those commonly found in the Gulf of Mexico.

Water injection wells may also be gravel packed because when a water injection well is shut-in, there can be a pressure surge or flowback into the wellbore which might result in an immediate flow of formation fines into the well. If formation fines are allowed to flow into the well, the formation could become plugged, which would prevent the resumption of injection of water into the well.

Similarly, wellbores can also be "frac packed". Frac packing involves the simultaneous hydraulic fracturing of a reservoir and the placement of a gravel pack in the annular region of the wellbore. In frac packing, a fracture is created using a high-viscosity fluid that is pumped into the formation at above the fracturing pressure. Gravel pack screens are in place at the time of pumping and function the same way as in a typical gravel packing operation. Creating the fracture helps improve production rates while the gravel pack prevents formation fines from being produced and the gravel pack screens prevent the proppants from entering the produced fluids. This method allows for high conductivity channels to penetrate deeply into the formation while leaving the area around the wellbore undamaged. More than 65% of the completions in the Gulf of Mexico use frac pack systems.

In each case, to maximize an increase in permeability and prevent proppant flowback, the proppant particulates can be consolidated inside the propped fracture or a gravel packed or frac packed region, forming a "proppant pack". Typically, resin-coating the proppant particulates allows for consolidation of the particulates at downhole conditions of temperatures of about 150° F. or higher and a closure stress of about 1000 psi. However, some hydraulic fracturing, gravel packing and frac packing procedures are conducted at much lower temperatures and in the case of gravel packing, with no closure stress.

It is desirable that curable resin-coated proppants remain unconsolidated under storage conditions and in a wellbore, at temperatures up to 200° F., but at zero closure stress. It is also desirable to consolidate the proppant pack in the wellbore on demand. In the past, it has not been possible to produce a resin-coated proppant that meets all of these criteria. Therefore, a need exists for a resin-coated proppant that remains unconsolidated during storage and in the wellbore, but is capable of forming a consolidated proppant pack downhole and in a gravel packing process at low temperatures and confining stresses.

BRIEF DESCRIPTION OF THE DRAWINGS

The present invention may best be understood by referring to the following description and accompanying drawings that are used to illustrate several exemplary embodiments of the invention. In the drawings.

DETAILED DESCRIPTION

Figure 1:
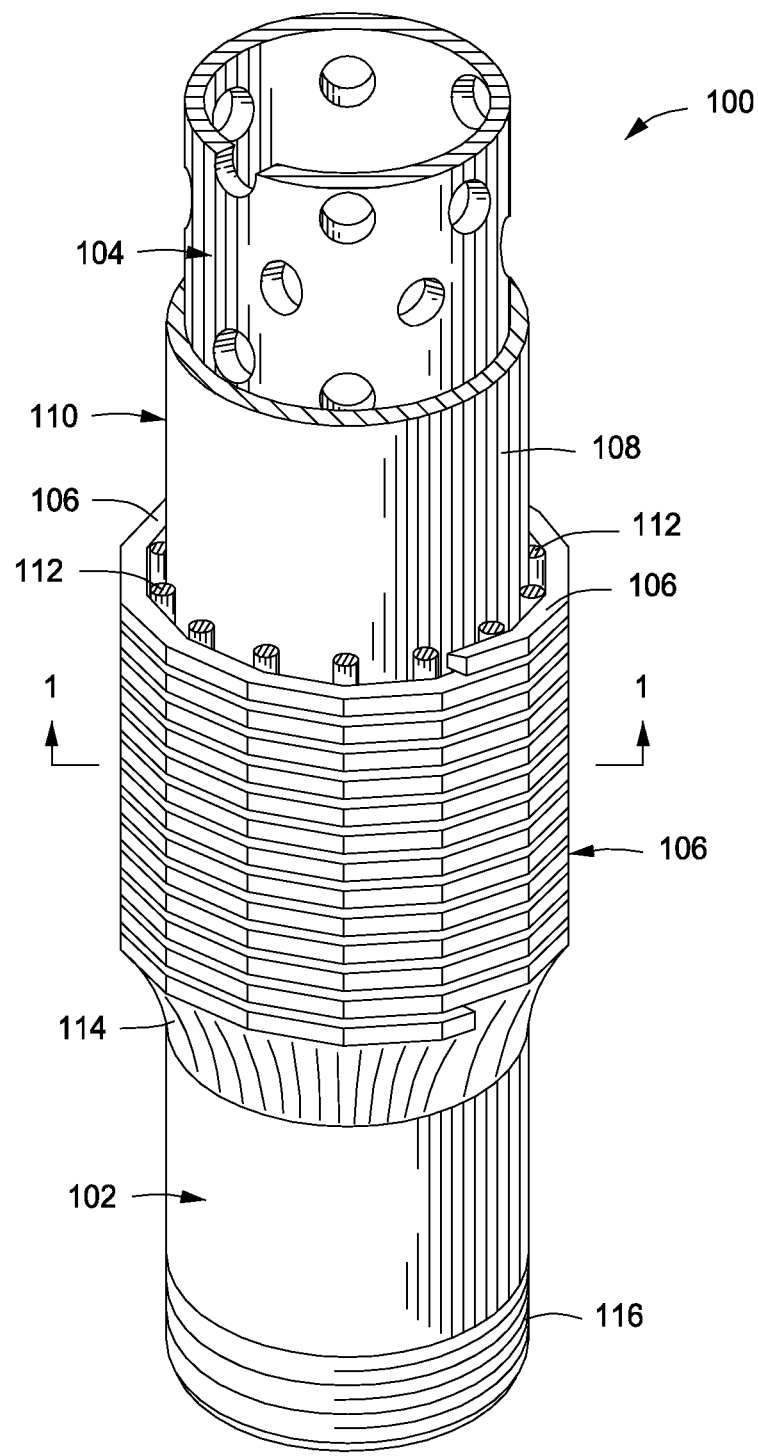
FIG. 1 depicts a perspective view of an illustrative prepack screen assembly containing a proppant pack, according to several exemplary embodiments of the present invention.

In the following description, numerous specific details are set forth. However, it is understood that embodiments of the invention may be practiced without these specific details. In other instances, well-known structures and techniques have not been described in detail in order not to obscure the understanding of this description.

As described herein, the term "unconsolidated" means proppant particulates that are not bonded to each other, either physically or chemically.

As described herein, the term "storage conditions" means temperatures of up to 150° F. and atmospheric pressure.

As described herein, the term "wellbore conditions" means temperatures of less than 200° F. and closure stress of less than 50 psi.

As described herein, the term "cured" means a resin coating containing less than or equal to 50% curability as defined by the standard test for acetone extraction.

As described herein, the term "Unconfined Compressive Strength" (or "UCS") is defined as the bond strength of a consolidated proppant particulate sample and is measured in psi. Typically, a consolidated proppant pack with a UCS of at least 20-100 psi within a hydraulic fracture will not flowback into the wellbore.

As described herein, the term "novolac resin" is defined as a phenol-formaldehyde resin (or phenolic resin) with a formaldehyde to phenol molar ratio of less than one.

As described herein, the term "apparent specific gravity" is defined as the weight per unit volume (grams per cubic centimeter) of proppant particulates, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

As described herein, the term "substantially round and spherical" and related forms, is defined to mean an average ratio of minimum diameter to maximum diameter of about 0.8 or greater, or having an average sphericity value of about 0.8 or greater compared to a Krumbein and Sloss chart.

According to several exemplary embodiments of the present invention, a proppant composition is provided that includes a plurality of unconsolidated particulates having a resin coating on the surface of the particulates, such that chemically active amine sites remain on the surface of the proppant particulates. The proppant composition remains unconsolidated under storage conditions, inside the wellbore and inside a subterranean fracture, gravel pack or frac pack in the absence of a reactive crosslinker. According to several exemplary embodiments of the present invention, the proppant composition remains unconsolidated under storage conditions of temperatures of up to 150° F., up to 100° F., or up to 50° F. and atmospheric pressure from about one month to about eighteen months.

According to several exemplary embodiments of the present invention, the proppant composition remains unconsolidated under wellbore conditions of temperatures of up to 200° F., up to 150° F., up to 100° F., or up to 50° F., and closure stress of up to 75 psi, up to 50 psi, or up to 35 psi. According to several exemplary embodiments, the proppant composition includes at least a portion thereof that remains unconsolidated under wellbore temperatures from about 20° F., about 40° F., about 60° F., or about 80° F. to about 120° F., about 140° F., or about 175° F. and under closure stress from about 5 psi to about 60 psi, about 10 psi to about 45 psi, or about 25 psi to about 40 psi.

According to several exemplary embodiments, the proppant composition includes any suitable proppant particulates. Suitable proppant particulates can be any one or more of lightweight ceramic proppant, intermediate strength proppant, high strength proppant, natural frac sand, porous ceramic proppant, glass beads, natural proppant such as walnut hulls, and any other manmade, natural, ceramic or glass ceramic body proppants. According to several exemplary embodiments, the proppant particulates include silica and/or alumina in any suitable amounts. According to several exemplary embodiments, the proppant particulates include less than 80 wt %, less than 60 wt %, less than 40 wt %, less than 30 wt %, less than 20 wt %, less than 10 wt %, or less than 5 wt % silica based on the total weight of the proppant particulates. According to several exemplary embodiments, the proppant particulates include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulates include at least about 30 wt %, at least about 50 wt %, at least about 60 wt %, at least about 70 wt %, at least about 80 wt %, at least about 90 wt %, or at least about 95 wt % alumina based on the total weight of the proppant particulates. According to several exemplary embodiments, the proppant particulates include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant composition includes proppant particulates that are substantially round and spherical having a size in a range between about 6 and 270 U.S. Mesh. For example, the size of the particulates can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments, the proppant composition includes proppant particulates having any suitable size. For example, the proppant particulates can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particles have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particles have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant composition includes proppant particulates having any suitable shape. The proppant particulates can be substantially round, cylindrical, square, rectangular, elliptical, oval, egg-shaped, or pill-shaped. For example, the proppant particulates can be substantially round and spherical. According to several exemplary embodiments, the proppant particulates of the proppant composition have an apparent specific gravity of less than 3.1 g/cm$^3$, less than 3.0 g/cm$^3$, less than 2.8 g/cm$^3$, or less than 2.5 g/cm$^3$. According to several exemplary embodiments, the proppant particulates have an apparent specific gravity of from about 3.1 to 3.4 g/cm$^3$. According to several exemplary embodiments, the proppant particulates have an apparent specific gravity of greater than 3.4 g/cm$^3$, greater than 3.6 g/cm$^3$, greater than 4.0 g/cm$^3$, or greater than 4.5 g/cm$^3$.

According to several exemplary embodiments, at least a portion of the proppant particulates of the proppant composition are coated with a resin material. According to several exemplary embodiments, at least about 50%, at least about 75%, at least about 85%, at least about 90%, at least about 95%, or least about 99% of the proppant particulates in the proppant composition are coated with the resin material. For example, all of the proppant particulates in the proppant composition can be coated with the resin material.

According to several exemplary embodiments, at least a portion of the surface area of each of the coated proppant particulates is covered with the resin material. According to several exemplary embodiments, at least about 10%, at least about 25%, at least about 50%, at least about 75%, at least about 90%, at least about 95%, or at least about 99% of the surface area of the coated proppant particulates is covered with the resin material. According to several exemplary embodiments, about 40% to about 99.9%, about 85% to about 99.99%, or about 98% to about 100% of the surface area of the coated proppant particulates is covered with the resin material. According to several exemplary embodiments, the entire surface area of the coated proppant particulates is covered with the resin material. For example, the coated proppant particulates can be encapsulated with the resin material.

According to several exemplary embodiments, the resin material is present on the proppant particulates in any suitable amount. According to several exemplary embodiments, the resin coated proppant particulates contain at least about 0.1 wt % resin, at least about 0.5 wt % resin, at least about 1 wt % resin, at least about 2 wt % resin, at least about 4 wt % resin, at least about 6 wt % resin, at least about 10 wt % resin, or at least about 20 wt % resin, based on the total weight of the resin coated proppant particulates. According to several exemplary embodiments, the resin coated proppant particulates contain about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin, based on the total weight of the resin coated proppant particulates.

According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has a polydispersity index from a low of about 1, about 1.75, or about 2.5 to a high of about 2.75, about 3.5, or about 4.5. For example, the phenol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. The phenol-formaldehyde resin can also have a polydispersity index of about 1 to about 1.5, about 1.5 to about 2.5, about 2.5 to about 3, about 3 to about 3.35, about 3.35 to about 3.9, or about 3.9 to about 4.5.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the resin coating applied to the proppant particulates is an epoxy resin. According to such embodiments, the resin coating can include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to several exemplary embodiments of the present invention, a curing agent is applied to the resin-coated proppant particulates in order to accelerate the transition of the resin from a liquid to a solid state. Suitable curing agents include curing agents that will leave active amine or epoxy sites on the surface of the resin coating. Suitable curing agents will depend on the specific resin chemistry employed and can include amines, acids, acid anhydrides, and epoxies. In several exemplary embodiments of the present invention, a phenolic resin material is applied to the surface of the proppant particulates and cured with an amine curing agent in order to leave active amine sites on the resin coated surface of the proppant particulates. In several exemplary embodiments, the phenolic resin is cured with hexamethylenetetramine, also known as hexamine. An example of a commercially available hexamine is Hexion™; which is available from Momentive.

According to several exemplary embodiments, the epoxy resin coating can be cured with an epoxy curing agent that leaves active epoxy sites on the resin coated surface of the proppant particulate. Examples of commercially available epoxy curing agents include Ancamine® 1638 and Ancamine® 2167, which are both available from Air Products and Chemicals, Inc.

According to several exemplary embodiments of the present invention, the cured resin-coated proppant composition is injected into a well during fracturing operations via suspension in a fracturing fluid, and deposited into induced fractures. According to several exemplary embodiments of the present invention, the fracturing fluid with suspended resin-coated proppant is injected into the annular region outside of the wellbore, behind a gravel pack screen. Suitable fracturing fluids are well known to those of ordinary skill in the art and typically include guar gum based fracturing fluids.

According to several exemplary embodiments of the present invention, the plurality of resin-coated proppant particulates residing in a propped fracture or in a gravel packed or frac packed region of the wellbore are contacted by a reactive crosslinker which cross-links with the resin-coated proppant particulates in order to form a consolidated proppant pack. According to several exemplary embodiments of the present invention, the reactive crosslinker is suspended in the unbroken fracturing fluid along with the resin-coated proppant particulates. According to several exemplary embodiments, the fracturing fluid includes from about one to about two percent by weight of the reactive crosslinker.

According to several exemplary embodiments, the fracturing fluid includes any suitable amount of reactive crosslinker. For example, the fracturing fluid can include about 0.01 wt %, about 0.05 wt %, about 0.1 wt %, about 0.5 wt %, or about 1 wt % to about 1.5 wt %, about 2 wt %, about 2.5 wt %, about 3 wt %, about 5 wt %, or about 10 wt % of the reactive crosslinker. The fracturing fluid can include about 0.025 wt % to about 8 wt %, about 0.25 wt % to about 6 wt %, about 0.75 wt % to about 4 wt %, about 0.95 wt % to about 2.75 wt %, or about 1 wt % to about 2 wt % of the reactive crosslinker. A reactive crosslinker to resin weight ratio in the fracturing fluid can be about 0.001:1 to about 100:1, about 0.01 to about 50:1, about 0.05:1 to about 20:1, about 0.1:1 to about 10:1, about 0.5:1 to about 5:1, about 0.8:1 to about 3:1, or about 0.9:1 to about 1.5:1.

According to several exemplary embodiments, suitable reactive crosslinkers for amine-cured novolac resins include water dispersible liquid epoxy resins and water dispersible solid epoxy resins. An example of a commercially available water dispersible liquid epoxy resin is XZ 92598.00, which is available from Dow Chemical. Examples of commercially available water dispersible solid epoxy resins include Ancarez® AR462 Resin and Ancarez® AR555 Epoxy Resin, which are available from Air Products and Chemicals, Inc. and D.E.R.™ 916 Epoxy Resin, which is available from Dow Chemical.

According to several exemplary embodiments, suitable reactive crosslinkers for epoxy resins cured with an epoxy coating that leaves active epoxy sites on the resin coated surface of the proppant particulate include water dispersible amine-rich resins. Examples of commercially available water dispersible amine-rich resin reactive crosslinkers include Anquamine® 701 and Anquawhite™ 100, which are both available from Air Products and Chemicals, Inc.

According to several exemplary embodiments of the present invention, both amine-cured phenolic and epoxy resin coated proppant particulates are suspended in a fracturing fluid. The amine-cured phenolic and epoxy resin coated proppant particles can be suspended in the fracturing fluid in any suitable amounts. For example, the fracturing fluid can include about 1 wt %, about 5 wt %, about 10 wt %, about 20 wt %, about 30 wt %, or about 40 wt % to about 50 wt %, about 60 wt %, about 70 wt %, about 80 wt %, about 90 wt %, about 95 wt %, or about 99 wt % amine-cured phenolic coated proppant particles and about 1 wt %, about 5 wt %, about 10 wt %, about 20 wt %, about 30 wt %, or about 40 wt % to about 50 wt %, about 60 wt %, about 70 wt %, about 80 wt %, about 90 wt %, about 95 wt %, or about 99 wt % epoxy resin coated proppant particles. The amine-cured phenolic coated proppant particles and epoxy resin coated proppant particles can be present in the fracturing fluid with an amine-cured phenolic coated proppant particles to epoxy resin coated proppant particles weight ratio of about 0.01:1 to about 20:1, about 0.1:1 to about 10:1, about 0.5:1 to about 5:1, about 0.8:1 to about 3:1, or about 0.9:1 to about 1.5:1.

According to several exemplary embodiments of the present invention, compatible reactive crosslinkers can also be suspended in the fracturing fluid. Commercially available examples of the resin coatings and reactive crosslinkers are listed above. The compatible reactive crosslinkers can be suspended in the fracturing fluid in any suitable amounts. For example, the amine-cured phenolic resin compatible crosslinkers can be present in the fracturing fluid in amounts of about 0.01 wt %, about 0.05 wt %, about 0.1 wt %, about 0.25 wt %, or about 0.5 wt % to about 1 wt %, about 1.5 wt %, about 2 wt %, about 2.5 wt %, about 5 wt %, or about 10 wt % based on the total combined weight of the fracturing fluid. The fracturing fluid can include about 0.025 wt % to about 8 wt %, about 0.15 wt % to about 4 wt %, about 0.35 wt % to about 3.5 wt %, about 0.55 wt % to about 2.75 wt %, or about 0.75 wt % to about 2 wt % amine-cured phenolic resin compatible crosslinker. The epoxy resin compatible crosslinkers can also be present in the fracturing fluid in amounts of about 0.01 wt %, about 0.05 wt %, about 0.1 wt %, about 0.25 wt %, or about 0.5 wt % to about 1 wt %, about 1.5 wt %, about 2 wt %, about 2.5 wt %, about 5 wt %, or about 10 wt % based on the total combined weight of the fracturing fluid. The fracturing fluid can include about 0.025 wt % to about 8 wt %, about 0.15 wt % to about 4 wt %, about 0.35 wt % to about 3.5 wt %, about 0.55 wt % to about 2.75 wt %, or about 0.75 wt % to about 2 wt % of the epoxy resin compatible crosslinker. The amine-cured phenolic resin compatible crosslinkers and epoxy resin compatible crosslinkers can be present in the fracturing fluid with an amine-cured phenolic resin compatible crosslinker to epoxy resin compatible crosslinker weight ratio of about 0.01:1 to about 20:1, about 0.1:1 to about 10:1, about 0.5:1 to about 5:1, about 0.8:1 to about 3:1, or about 0.9:1 to about 1.5:1.

The fracturing fluid with suspended resin-coated proppant particles and one or more compatible reactive crosslinkers can have any suitable viscosity and pH. For example, the fracturing fluid with suspended resin-coated proppant particles and one or more compatible reactive crosslinkers can have a viscosity of about 0.01 cP, about 0.05 cP, about 0.1 cP, about 0.5 cP, or about 1 cP to about 2 cP, about 3 cP, about 5 cP, about 7 cP, about 10 cP, about 50 cP, about 100 cP, about 200 cP, about 500 cP, about 1,000 cP, about 5,000 cP, or about 10,000 cP at a temperature of about 25° C. The fracturing fluid with suspended resin-coated proppant particles and one or more compatible reactive crosslinkers can have a pH of about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13. The fracturing fluid with suspended resin-coated proppant particles and one or more compatible reactive crosslinkers can remain pumpable for up to about 1.5 hr, up to about 2 hr, up to about 4 hr, up to about 8 hr, up to about 12 hr, up to about 24 hr, or up to about 48 hr at temperatures of about 100° F., about 130° F., or about 150° F. to about 175° F., about 200° F., or about 215° F.

Due to the turbulent fluid flow associated with the injection of a fracturing fluid with suspended resin-coated proppant particulates and a reactive crosslinker into a well bore, the consolidation reaction between the resin-coated proppant particulates and the reactive crosslinker does not start immediately to any substantive degree. Once the resin-coated proppant particulates are placed in the fractures or gravel packed or frac packed region, the well is shut in. This allows the consolidation reaction between the resin-coated proppant particulates and the reactive crosslinker to begin. According to several exemplary embodiments of the present invention, the well can be shut in for about 4 hours up to one week, depending on the downhole temperature and pressure conditions. One of ordinary skill in the art would be able to determine how long the well needs to be shut in in order for the consolidation reaction to take place at a given set of well conditions.

When the reactive crosslinker contacts the resin-coated proppant particulates, a crosslinking reaction occurs between adjacent proppant particulates, which in turn then form a consolidated proppant pack. According to several exemplary embodiments of the present invention, the resin-coated proppant particulates are consolidated by either bonding between the reactive crosslinker and proppant particulates, or bonding of the proppant particulates to each other, or combinations thereof.

Once the resin-coated proppant particulates are placed in the formation, gravel pack or frac pack, the fracturing fluid is "broken". Breaking the fracturing fluid allows the fracturing fluid to be removed from the fractures or gravel packed or frac packed region of the subterranean formation without dislodging the consolidated proppant pack. The reactive crosslinker does not interfere with the breaking of the fracturing fluid.

In a gravel pack or frac pack situation, when the fracturing fluid is broken, the proppant (or "gravel") remains behind a gravel pack screen, while the broken fracturing fluid flows back into the wellbore. The screen works essentially as a filter, leaving the consolidated proppant pack on one side and allowing the broken fracturing fluid to flow to the other.

According to several exemplary embodiments of the present invention, a method for the hydraulic fracturing of a subterranean formation is provided. According to several exemplary embodiments of the present invention, a propped fracture is provided wherein a plurality of unconsolidated resin-coated proppant particulates reside in at least a portion of the fracture. In accord with several exemplary embodiments of the present invention, a reactive crosslinker is introduced into the propped fracture. Suitable reactive crosslinkers are detailed above. When the reactive crosslinker is introduced into the propped fracture, it contacts the resin-coated proppant particulates. In several exemplary embodiments of the present invention, a consolidated proppant pack is formed as a result of the contact between the resin-coated proppant particulates and the reactive crosslinker. In several exemplary embodiments of the present invention, the resin-coated proppant particulates are consolidated by either physical or chemical bonding, or combinations thereof.

According to several exemplary embodiments of the present invention, the consolidated proppant pack can be formed in-situ under wellbore conditions. For example, the consolidated proppant pack can be formed by contacting the resin-coated proppant particulates with the reactive crosslinker under a temperature of about 160° F., about 170° F., about 180° F., about 185° F., or about 190° F. to about 195° F., about 200° F., about 205° F., about 210° F., about 225° F., or about 250° F. According to several exemplary embodiments of the present invention, the consolidated proppant pack can be formed by contacting the resin-coated proppant particulates with the reactive crosslinker under a pressure of about 0.01 psi, about 0.5 psi, about 1 psi, about 5 psi, about 10 psi, or about 25 psi to about 35 psi, about 45 psi about 50 psi, or about 100 psi. For example, the consolidated proppant pack can be formed by contacting the resin-coated proppant particulates with the reactive crosslinker under a temperature of about 165° F. to about 230° F., about 175° F. to about 220° F., about 193° F. to about 215° F., or about 197° F. to about 207° F. and a pressure of about 2 psi to about 75 psi, about 5 psi to about 60 psi, or about 15 psi to about 50 psi.

According to several exemplary embodiments of the present invention, the proppant pack will remain unconsolidated until it is at least partially contacted by the crosslinker. The consolidated proppant pack can have a Unconfined Compressive Strength (UCS) of about 1 psi, about 5 psi, about 10 psi, about 25 psi, about 35 psi, about 50 psi, about 60 psi, about 75 psi, about 85 psi, or about 95 psi to about 100 psi, about 120 psi, about 150 psi, about 175 psi, about 200 psi, about 225 psi, about 250 psi, or about 500 psi under a pressure of about 0.01 psi, about 0.5 psi, about 1 psi, about 5 psi, about 10 psi, or about 25 psi to about 35 psi, about 45 psi about 50 psi, or about 100 psi and a temperature of about 160° F., about 170° F., about 180° F., about 185° F., or about 190° F. to about 195° F., about 200° F., about 205° F., about 210° F., about 225° F., or about 250° F. A consolidated proppant pack formed from a fracturing fluid containing from about 0.01 wt % to about 0.5 wt % of a reactive crosslinker can have a UCS of about 10 psi to about 100 psi or from about 25 psi to about 75 psi. A consolidated proppant pack formed from a fracturing fluid containing from about 0.6 wt % to about 1.4 wt % of a reactive crosslinker can have a UCS of about 100 psi to about 250 psi or from about 115 psi to about 220 psi. A consolidated proppant pack formed from a fracturing fluid containing from about 1.5 wt % to about 2.5 wt % of a reactive crosslinker can have a UCS of about 250 psi to about 400 psi or from about 300 psi to about 350 psi.

According to several exemplary embodiments of the present invention, a proppant composition can form a consolidated proppant pack after the proppant composition has been subjected to storage conditions of temperatures of up to 150° F., up to 100° F., and up to 50° F. and atmospheric pressure from about one month to about eighteen months. For example, a proppant composition subjected to storage conditions of temperatures of up to 150° F., up to 100° F., and up to 50° F. and atmospheric pressure from about one month to about eighteen months can form a consolidated proppant pack having a UCS the same as or substantially similar to a consolidated proppant pack formed from a proppant composition that has not been subjected to storage conditions.

According to several exemplary embodiments of the present invention, the consolidated proppant pack can be contacted with or flushed with any suitable gel-breaker material, such as metal halide salts. For example, the gel-breaker material can include lithium chloride (LiCl), sodium chloride (NaCl), potassium chloride (KCl), rubidium chloride (RbCl), or cesium chloride (CsCl), or any mixtures or combinations thereof. Contacting the consolidated proppant pack with a gel-breaker material can increase the UCS of the consolidated proppant pack by at least about 5%, at least about 10%, at least about 20%, at least about 30%, or at least about 35%.

Further, pursuant to the present invention, a prepacked screen is provided. According to several exemplary embodiments of the present invention, a prepacked screen is provided wherein a plurality of unconsolidated resin-coated proppant particulates reside within at least a portion of the screen prior to placement of the screen downhole. The reactive crosslinker can be introduced into the resin-coated proppant containing prepacked screen. Suitable reactive crosslinkers are detailed above. When the reactive crosslinker contacts the resin-coated proppant particulates, a crosslinking reaction occurs between adjacent proppant particulates, which in turn then form a consolidated proppant pack within the prepacked screen assembly. In several exemplary embodiments of the present invention, the resin-coated proppant particulates are consolidated by either physical or chemical bonding, or combinations thereof.

Figure 2:
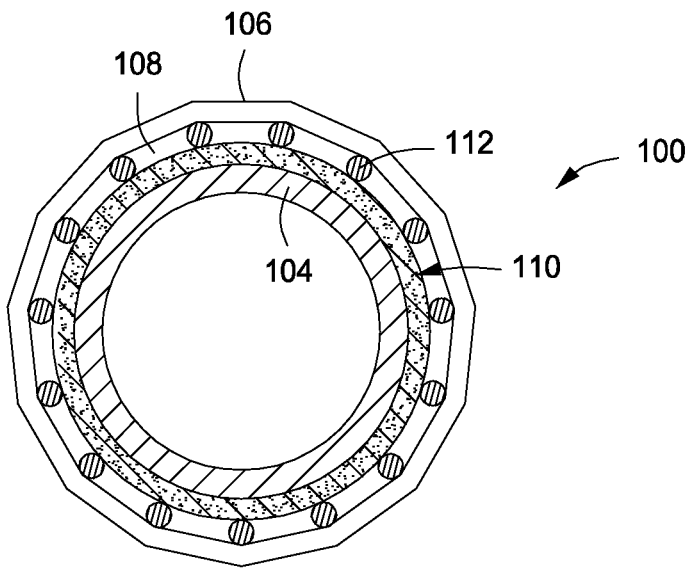
FIG. 2 depicts a cross-sectional view of the prepack screen taken along line 1-1 of FIG.

FIG. 1 depicts a perspective view of an illustrative pre-pack screen assembly 100 containing a consolidated proppant pack 110, according to several exemplary embodiments. As shown in FIG. 1, the prepack screen assembly 100 can include a tubular 102 having a perforated section 104. At least a portion of the perforated section 104 can be surrounded by a screen 106. For example, the screen 106 can be circumferentially disposed about the perforated section 104 and axially aligned with tubular 102. An annulus 108 can be formed between the tubular 102 and the screen 106. A consolidated proppant pack 110 can be disposed between the tubular 102 and the screen 106, in the annulus 108. A plurality of longitudinally arranged rods 112 can be disposed about the consolidated proppant pack 110 such that the screen 106 is at least partially offset from the consolidated proppant pack 110. The rods 112 can be spaced apart from one another and arranged coaxially with the tubular 102. The screen 106 can be wrapped around the rods 112 and welded to the tubular 102 via welds 114. The tubular 102 can include a threaded portion 116 on at least one end thereof for connecting the prepack screen assembly 100 to production tubing (not shown), for example. FIG. 2 depicts a cross-sectional view of the prepack screen taken along line 1-1 of FIG. 1. Examples of prepack screen assemblies can be found in U.S. Pat. Nos. 4,487,259 and 5,293,935, the entire disclosures of which are incorporated herein by reference.

The consolidated proppant pack 110 can be consolidated before, during, or after inclusion of the proppant particulates in the annulus 108. For example, loose, unconsolidated resin-coated proppant particulates can be introduced to the annulus 108 of the prepack screen assembly 100. After introduction of the resin-coated proppant particulates to the annulus 108, the reactive crosslinker can contact the resin-coated proppant particles to produce the consolidated proppant pack 110. After completion of the prepack screen assembly 100 at the surface, the pre-pack assembly 100 can be lowered downhole to a desired depth.

The following examples are illustrative of the compositions and methods discussed above.

EXAMPLES

Several commercially available water dispersible epoxy resins are listed in Table 1. These water dispersible epoxy resins are representative of the class of epoxy resins that may be suitable for use as a reactive crosslinker in several exemplary embodiments of the present invention, but are not intended to be exhaustive.

TABLE 1

| Sample Name | Composition |
|---|---|
| Ancarez ® AR555 Epoxy Resin (available from Air Products and Chemicals, Inc.) | Oxirane, 2,2,'-[(1-methylethylidene)bis (4,1-phenyleneoxymethylene)bis-homopolymer (50-60%) Water (40-50%) |
| Ancarez ® AR462 Resin (available from Air Products and Chemicals, Inc.) | Bisphenol A diglycidyl ether resin (55-65%) Water (35-45%) |
| D.E.R. ™ 916 Epoxy Resin (available from Dow Chemical) | Modified, semi-solid, epoxy novolac resin Reaction product of phenol-formaldehyde novolac with epichlorohydrin emulsified in water |
| XZ 92598.00 Experimental Liquid Epoxy Resin Emulsion (available from Dow Chemical) | Propane, 2,2-bis[p-(2,3-epoxypropoxy)phenyl]-, polymers (40-60%) Water (20-40%) Nonionic surfactant (<10%) |
| D.E.R. ™ 3913 Epoxy Resin (available from Dow Chemical) | Modified epoxy resin (30-50%); Propane, 2,2-bis[p-(2,3-epoxypropoxy)phenyl]-, polymers (25-45%); Reaction product: Bisphenol F-(epichlorhydrin) (<15%); Alkyl ($C_{12\text{-}14}$) glycidyl ether (<10%) |

The experiments described below were carried out using exemplary materials in order to determine the compatibility of the epoxy resins with fracturing fluids. These experiments are meant to be illustrative of exemplary embodiments of the present invention and are not intended to be exhaustive.

Fracturing Fluid Compatibility Testing

According to several exemplary embodiments of the present invention, a reactive crosslinker is injected into a fracture, gravel pack or frac pack along with a fracturing fluid in order to contact resin-coated proppant particulates residing in the fracture, gravel pack or frac pack. Therefore, according to such embodiments, it is desirable that the reactive crosslinker is compatible with the fracturing fluid so that the reactive crosslinker retains its activity until it reaches the resin-coated proppant particulates residing in the fracture, gravel pack or frac pack. Accordingly, four epoxy resin samples were tested for their compatibility with a fracturing fluid.

First, a fracturing fluid was prepared by weighing out 1500 g of deionized water into a 2 L beaker. To provide gel clean-up, 30.0 g of KCl was added to the water using an overhead stirrer and was mixed until completely dissolved. 7.2 g of guar gum, a thickening agent, was then slowly added to the vortex and the pH of the solution was adjusted (with 1N HCl or NaOH as necessary) to reach a pH of between 5-7. The mixture was then stirred for 15 minutes. The fracturing fluid was then allowed to hydrate for at least four hours by allowing the fracturing fluid to sit quiescent at ambient temperature. After hydration, the pH of the fracturing fluid was adjusted to 10.1-10.5 with 1N NaOH to condition the fluid as necessary.

Four reactive crosslinkers were then labeled "AR555", "AR462", "DER 916", and "DER 3913" to represent the epoxy dispersions listed in Table 1, and 500 g of the fracturing fluid was placed into each beaker. 5.0 g of each epoxy dispersion (or 1% by weight) was added to the appropriate reactive crosslinker and the components were mixed. Then, 200.0 g of each fracturing fluid/dispersion mixture was placed into a blender jar and was blended until a vortex formed. Next, 0.12 g of ammonium peroxydisulfate, ALS grade 98% minimum, which is commercially available from Alfa Aesar®, was added to the blender to function as a fracturing fluid breaker. The mixtures were stirred for 15 seconds. Then, 192.0 g of CarboBond®Lite® 20/40 resin-coated lightweight ceramic proppant which is commercially available from CARBO Ceramics, Inc. was added to the mixtures and stirred until a vortex is formed. Finally, 0.1 g of sodium tetraborate pentahydrate fracturing fluid crosslinker, which is commercially available from Fritz Industries®, was added to the mixtures.

The samples were heated on a hotplate to approximately 180° F. with an overhead stirrer in order to break the fracturing fluid. The samples were then placed in a water bath heated to 194° F. for 90 minutes. After 90 minutes, the samples were allowed to cool to room temperature and the broken fracturing fluid was decanted off the proppant particulates. A viscosity measurement of the samples was then taken using a Fann Model 35A viscometer with a B-2 bob. A viscosity of less than 20 cP at room temperature is considered to indicate that the reactive crosslinker is compatible with the fracturing fluid. Table 2 summarizes the viscosity results for the four prepared samples.

TABLE 2

| Sample | Viscosity at Room Temperature (cP) | pH | Temperature (° F.) |
|---|---|---|---|
| Ancarez ® AR555 Epoxy Resin | 2.5 | 9 | 75 |
| Ancarez ® AR462 Resin | 2.5 | 9 | 75 |
| D.E.R. ™ 916 Epoxy Resin | 2.5 | 9 | 75 |
| D.E.R. ™ 3913 Epoxy Resin | 2.5 | 9 | 75 |

A second experiment was performed using the above procedure, except that the composition included 2% by weight of the epoxy dispersion (10.0 g added to 500 g of fracturing fluid). According to this experiment, Ancarez® AR555 Epoxy Resin, Ancarez® AR462 Resin, D.E.R.™ 916 Epoxy Resin, and epoxy resin emulsion XZ 92598.00 Experimental Liquid Epoxy Resin were tested. Table 3 summarizes the viscosity results for these four samples.

TABLE 3

| Sample | Viscosity at Room Temperature (cP) | pH | Temperature (° F.) |
|---|---|---|---|
| Ancarez ® AR555 Epoxy Resin | 2.5 | 9 | 75 |
| Ancarez ® AR462 Resin | 2.5 | 9 | 75 |
| D.E.R. ™ 916 Epoxy Resin | 2.5 | 9 | 75 |

TABLE 3-continued

| Sample | Viscosity at Room Temperature (cP) | pH | Temperature (° F.) |
|---|---|---|---|
| XZ 92598.00 Experimental Liquid Epoxy Resin Emulsion | 2.5 | 9 | 75 |

UCS Testing (Using 40 Pounds of Borate-Crosslinked Fracturing Fluid)

The experiments described below were performed with exemplary materials in order to determine the UCS of certain resin-coated proppants after consolidation. These experiments are meant to be illustrative of exemplary embodiments of the present invention and are not intended to be exhaustive. These experiments were designed to simulate actual downhole conditions.

Four fracturing fluid proppant samples which included 1% by weight of the epoxy dispersion were prepared using the procedure described above, except that the fracturing fluid was not decanted from the proppant particulates. A proppant slug of each of the four samples (Ancarez® AR555 Epoxy Resin, Ancarez® AR462 Resin, D.E.R.™ 916 Epoxy Resin, and D.E.R.™ 3913 Epoxy Resin) was loaded into the metallic cylinder of a UCS cell and the fracturing fluid was broken. The bottom valves of the UCS cells were closed, but the top valves were left open to simulate a zero stress environment. The proppant slugs were not rinsed. The UCS cells were placed in an oven at 200° F. for 64 hours. After 64 hours, the UCS cells were removed from the oven and the proppant slugs were placed in a desiccator to dry overnight. The resultant proppant slugs were prepared for testing by filing the edges perpendicular to the sides. The slugs were then crushed using an Admet Universal Testing Machine with Dual Column, model eXpert 2600, with a 2000 pound load cell. The proppant slugs were subjected to a compressive load at a rate of 0.1 in/min and the UCS is the measurement of the compressive load at the point of breakage divided by the area of the proppant slug. Table 4 summarizes the results of the UCS test on the four prepared samples.

TABLE 4

| Sample | UCS, psi (Zero Stress, 200° F.) |
|---|---|
| Ancarez ® AR555 Epoxy Resin | 20 |
| Ancarez ® AR462 Resin | 20 |
| D.E.R. ™ 916 Epoxy Resin | 29 |
| D.E.R. ™ 3913 Epoxy Resin | 60 |

A second UCS experiment was conducted, except that the compositions included 2% by weight of the epoxy dispersion. According to this experiment, Ancarez® AR555 Epoxy Resin, Ancarez® AR462 Resin, D.E.R.™ 916 Epoxy Resin, and epoxy emulsion XZ92598 Experimental Liquid Epoxy Resin Emulsion were tested. Table 5 summarizes the results of the UCS test on the four samples.

TABLE 5

| Sample | UCS, psi (Zero Stress, 200° F.) | Length (in.) | Typical length under UCS conditions at 1000 psi |
|---|---|---|---|
| Ancarez ® AR555 Epoxy Resin | 70 | 3.25 | 2.12-2.25 |
| Ancarez ® AR462 Resin | 201 | 3.25 | 2.12-2.25 |
| D.E.R. ™ 916 Epoxy Resin | 57 | 3.25 | 2.12-2.25 |
| XZ 92598.00 Experimental Liquid Epoxy Resin Emulsion | 117 | 3.25 | 2.12-2.25 |

UCS Testing (Using 80 Pounds of HEC Fracturing Fluid)

A UCS experiment was conducted using D.E.R.™ 3913 Epoxy Resin in 80 pounds of HEC (Hydroxyethylcellulose) fracturing fluid. The 80 pounds of HEC fracturing fluid was prepared by weighing out 1000 g of deionized water into a 2 L beaker. 24 mL of the HEC concentrated suspension was added to the water using an overhead stirrer and was mixed until completely dissolved. The pH was then adjusted to a pH of 8-9 with 1N NaOH. The solution was allowed to reach full viscosity within a minute or two with constant stirring. Next, 15 mL of Vicon NF, a fracturing fluid that is commercially available from Halliburton Energy Services, Inc., was added to act as a fracturing fluid breaker. 20.0 mL of D.E.R.™ 3913 Epoxy Resin (or 2% by volume) was added to the fracturing fluid to act as a reactive crosslinker. 66.0 g of CarboBond®Lite® 20/40 resin-coated lightweight ceramic proppant which is commercially available from Carbo Ceramics, Inc., was added to a clean beaker. 80 mL of the prepared fracturing fluid was added. Using an overhead stirrer, the proppant/fluid mixture was mixed for 1 minute. The proppant/fluid mixture was then transferred to a UCS cell and the fracturing fluid was drained out through the bottom valve. The valves on the UCS cells were left open to simulate a zero stress environment. The unpressurized UCS cell was then placed in an oven set at 200° F. for 24 hours. A second set of UCS experiments was repeated using the same procedure above but with a 2% KCl rinse. After the proppant/fluid mixture was transferred to a UCS cell and the fracturing fluid drained out, the proppant pack in the UCS cell was flushed with 2% KCl (in deionized water). The unpressurized UCS cell was then placed in an oven set at 200° F. for 24 hours. After 24 hours, the cells were removed from the oven, the proppant slugs were removed from the UCS cell and the proppant slugs were allowed to cool and dry for at least 24 hours. The resultant proppant slugs were prepared for testing by filing the edges perpendicular to the sides. The slugs were then crushed using an Admet Universal Testing Machine with Dual Column, model eXpert 2600, with a 2000 pound load cell. The proppant slugs were subjected to a compressive load at a rate of 0.1 in/min and the UCS is the measurement of compressive load at the point of breakage divided by the area of the proppant slug. Unexpectedly, the 2% KCl rinse increased the UCS of the sample. Table 6 summarizes the results of the UCS test on these prepared samples.

TABLE 6

| Sample | Proppant Type | KCl Rinse (mL) | UCS, psi (Zero Stress, 200° F.) |
|---|---|---|---|
| D.E.R. ™ 3913 Epoxy Resin | CarboBond ® Lite ® 20/40 | 0 | 237 |
| D.E.R. ™ 3913 Epoxy Resin | CarboBond ® Lite ® 20/40 | 100 | 328 |

A third set of UCS experiments using the 80 pound HEC Fracturing Fluid was conducted on CarboBond®Lite® 16/20 resin-coated lightweight ceramic proppant which is commercially available from CARBO Ceramics, Inc. in a similar manner as mentioned above. Table 7 summarizes the results of the UCS test on these prepared samples. The KCL rinse also increased the UCS of the sample.

TABLE 7

| Sample | Proppant Type | KCl Rinse (mL) | UCS, psi (Zero Stress, 200° F.) |
|---|---|---|---|
| D.E.R. ™ 3913 Epoxy Resin | CarboBond ® Lite ® 16/20 | 0 | 172 |
| D.E.R. ™ 3913 Epoxy Resin | CarboBond ® Lite ® 16/20 | 100 | 210 |

Figure 3:
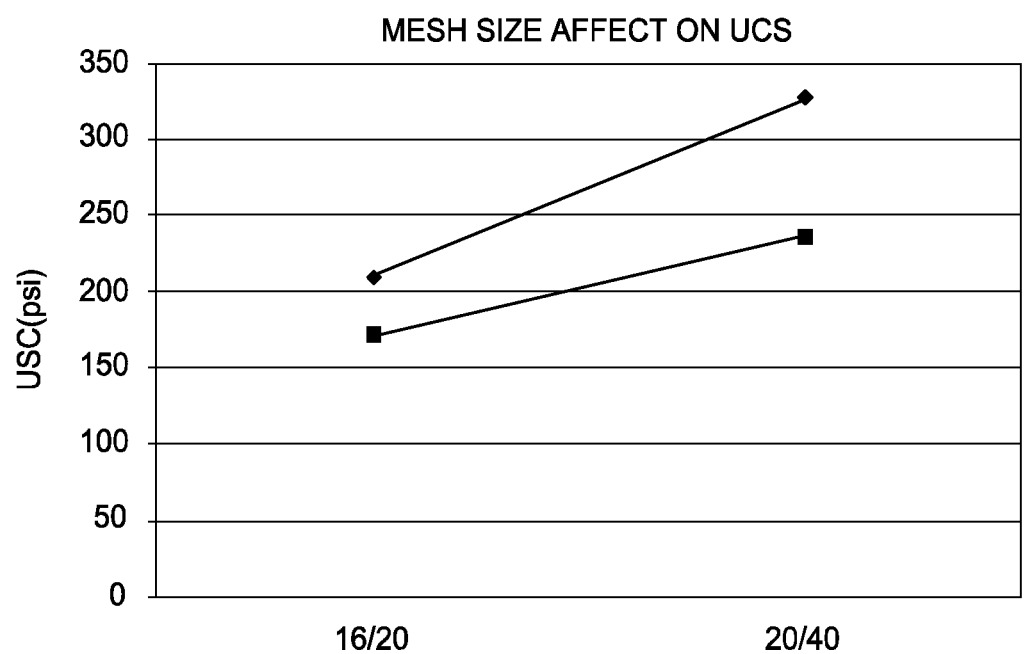
FIG. 3 depicts a graphical representation showing the effect of proppant size on Unconfined Compressive Strength (UCS).

The effect of the size of the proppant particulates on UCS strength is shown in FIG. 3. The reduction in UCS strength when going from proppant with a mesh size distribution between 20/40 to proppant with a mesh size distribution between 16/20 is observed. This result is expected due to the reduced points of contact that result from larger particles. Despite the increase in proppant size, the 16/20 mesh proppant still exhibits relatively high UCS strength.

Figure 4:
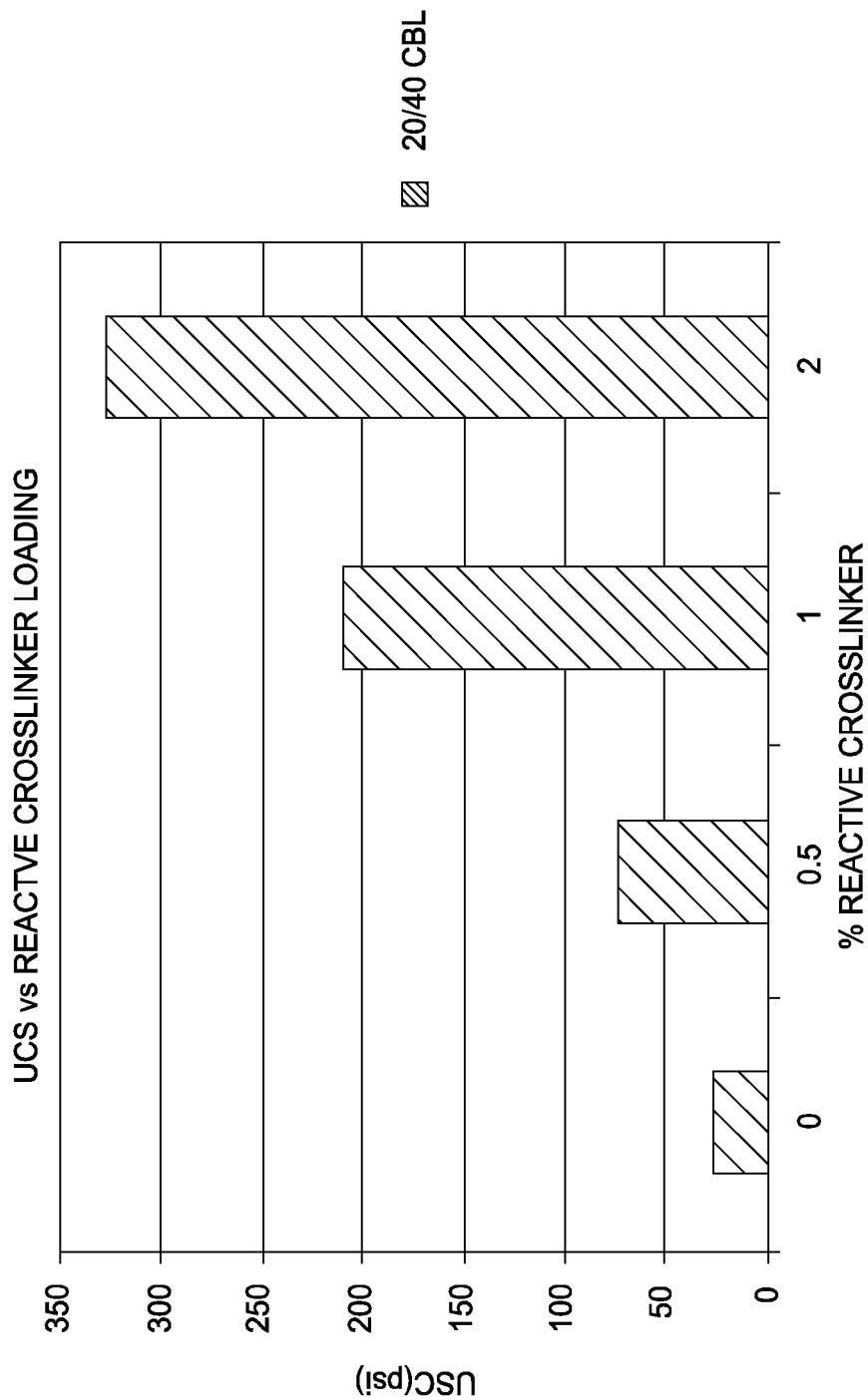
FIG. 4 depicts a graphical representation showing the effect of reactive crosslinker concentration on Unconfined Compressive Strength (UCS).

A fourth set of UCS experiment using the 80 pound HEC Fracturing Fluid was conducted on CarboBond®Lite® 20/40 resin-coated lightweight ceramic proppant, which is commercially available from CARBO Ceramics, Inc., in a similar manner as mentioned above but with different reactive crosslinker loadings (0 vol %, 0.5 vol %, 1 vol % and 2 vol %). The plot shown in FIG. 4 summarizes the results of the UCS test on these prepared samples.

130° F. Storage Stability Test

In order to test whether or not the resin-coated proppant particulates would consolidate or the finished properties would change under elevated storage conditions in the absence of a reactive crosslinker, samples of CarboBond®Lite® 20/40 resin-coated lightweight ceramic proppant, which is commercially available from CARBO Ceramics, Inc., were heated in an oven set at 130° F. for a duration of one month. A weekly sample was then removed from the oven, allowed to equilibrate to room temperature, residual cure and UCS were then determined. Table 8 summarizes the results of these tests on the prepared samples.

TABLE 8

| Time (week) | Results |
|---|---|
| 0 | Baseline |
| 1 | No change from Baseline |
| 2 | No change from Baseline |
| 3 | No change from Baseline |

TABLE 8-continued

| Time (week) | Results |
| --- | --- |
| 4 | No change from Baseline |

140° F. Extended Storage Stability Test

In order to test whether or not the resin-coated proppant particulates would consolidate or the finished properties would change under elevated storage conditions in the absence of a reactive crosslinker, samples of CarboBond®Lite® 20/40 resin-coated lightweight ceramic proppant, which is commercially available from CARBO Ceramics, Inc., were heated in an oven set at 140° F. for a duration of 350 days. Samples were periodically removed from the oven, allowed to equilibrate to room temperature, and UCS at 250° F. was then determined. The samples maintained a UCS of about 1,010 psi for about 250 days and possessed a UCS ranging from about 950 psi to about 1,010 psi for about the last 100 days of the 350 day test.

Cure Kinetics

In order to determine the working time or the time it takes the proppant/fluid mixture to reach a viscosity where it becomes unworkable, samples of CarboBond®Lite® 20/40 resin-coated lightweight ceramic proppant, which is commercially available from CARBO Ceramics, Inc., were exposed to an 80 pound HEC fluid with 1.5% Vicon NF (breaker) and 2% D.E.R.™ 3913 Epoxy Resin (reactive crosslinker) at 100° F., 130° F., 150° F., 175° F. and 200° F. Samples were then removed at different time points and the UCS was determined. Table 9 summarizes the results of these tests on the prepared samples.

TABLE 9

| Temperature | Working Life (hr) |
| --- | --- |
| 100° F. | 24-48 |
| 130° F. | 12-18 |
| 150° F. | 3-4 |
| 175° F. | 1.5-2 |
| 200° F. | 1-1.5 |

The data in Table 9 shows that the proppant/fluid mixture remains flowable/pumpable for up to 1.5 hr, 1.5-2 hr, 3-4 hr, 12-18 hr and 24-48 hr at 200° F., 175° F., 150° F., 130° F. and 100° F., respectively.

Consolidation Test

In order to test whether or not the resin-coated proppant particulates would consolidate under wellbore conditions in the absence of a reactive crosslinker, three fracturing fluid proppant samples which contained 1% by weight of the epoxy dispersion of Ancarez® AR555 Epoxy Resin, Ancarez® AR462 Resin and D.E.R.™ 916 Epoxy Resin were prepared. The samples were prepared using the procedure outlined above. The samples were taken after 0.12 g of the peroxydisulfate breaker was added to the mixture. The hot plate procedures were not used to avoid breaking the fracturing fluid.

A proppant slug sample that included the Ancarez® AR555 Epoxy Resin, Ancarez® AR462 Resin and D.E.R.™ 916 Epoxy Resin epoxy dispersions were placed into glass jars and heated to 200° F. for 48 hours. After 48 hours, the proppant was observed for consolidation. Table 10 summarizes the results of the consolidation tests.

TABLE 10

| Sample | Observation |
| --- | --- |
| Ancarez® AR555 Epoxy Resin | Unconsolidated |
| Ancarez® AR462 Resin | Unconsolidated |
| D.E.R.™ 916 Epoxy Resin | Unconsolidated |

This data shows that the proppant samples remained unconsolidated in the presence of unbroken fracturing fluid, indicating that the resin-coated proppant particulates will remain unconsolidated under wellbore conditions.

While the present invention has been described in terms of certain embodiments, those of ordinary skill in the art will recognize that the invention can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of hydraulic fracturing of a subterranean formation, the method comprising:
    providing, into a wellbore, a suspension comprising (i) a fracturing fluid, (ii) an emulsion of a water dispersible liquid epoxy resin, and (iii) a plurality of resin-coated proppant particulates each comprising a proppant particulate having a resin coating on its outer surface, the resin coating having active amine sites;
    mixing the fracturing fluid, the emulsion of the water dispersible liquid epoxy resin, and the plurality of resin-coated proppant particulates by flowing the fracturing fluid, the emulsion of the water dispersible liquid epoxy resin, and the plurality of resin-coated proppant particulates through the wellbore to provide a mixture;
    introducing the mixture into a fracture located in the subterranean formation; and
    consolidating at least a portion of the plurality of resin-coated proppant particulates in the fracture by reacting, via a consolidation reaction, the water dispersible liquid epoxy resin with the active amine sites of the resin coating of adjacent resin-coated proppant particulates in the mixture, wherein the consolidating of the portion of the resin-coated proppant particulates takes place at a temperature of 100° F. to 130° F.

2. The method of claim 1, wherein the proppant particulates are selected from the group consisting of a lightweight ceramic proppant, an intermediate strength ceramic proppant, a high strength ceramic proppant, a natural frac sand, a porous ceramic proppant, glass beads, and any combination thereof.

3. The method of claim 1, wherein the resin coating comprises an amine-cured novolac resin coating.

4. The method of claim 3, wherein the amine-cured novolac resin comprises a hexamine-cured novolac resin.

5. The method of claim 1, wherein the fracturing fluid has a viscosity of about 0.01 cP to about 10,000 cP at a temperature of 25° C.

6. A method of consolidating a plurality of resin-coated particulates in an annular region of a wellbore, the method comprising:

providing, into a wellbore, a suspension comprising (i) a fracturing fluid, (ii) an emulsion of a water dispersible liquid epoxy resin, and (iii) a plurality of resin-coated particulates each comprising a proppant particulate having a resin coating having an active amine site on its outer surface;

mixing the suspension by flowing the suspension through the wellbore to form a mixture;

introducing the mixture into the annular region of the wellbore to form a gravel pack; and consolidating at least a portion of the plurality of resin-coated particulates by reacting in the annular region, via a consolidation reaction, the water dispersible liquid epoxy resin with the active amine site of the resin coating of adjacent resin-coated proppant particulates in the mixture;

wherein the consolidating of the portion of the plurality of the resin-coated particulates takes place at a temperature of 100° F. to 130° F. and closure stress of less than 50 psi.

7. The method of claim 6, wherein the gravel pack is placed in a water injection well.

8. The method of claim 6, wherein the resin coating comprises an amine-cured novolac resin coating.

9. The method of claim 8, wherein the amine-cured novolac resin comprises a hexamine-cured novolac resin.

10. The method of claim 8, wherein the gravel pack fluid has a viscosity of about 0.01 cP to about 10,000 cP at a temperature of 25° C.

11. The method of claim 6, wherein at least 95% of the surface area of the outer surface of each of the proppant particulates of the plurality of resin-coated particulates is coated with the resin coating.

12. The method of claim 6, wherein the mixture has a resin-coated particulate concentration of about 10 wt % to about 50 wt % based on the total weight of the mixture.

13. The method of claim 6, wherein the plurality of resin-coated particulates comprises about 1 wt % to about 8 wt % amine-cured novolac resin.

14. The method of claim 6, wherein the water dispersible liquid epoxy resin comprises 2,2-bis[p-(2,3-epoxypropoxy)phenyl]propane polymer.

* * * * *